(12) United States Patent
Baek et al.

(10) Patent No.: US 7,988,169 B2
(45) Date of Patent: Aug. 2, 2011

(54) BICYCLE WITHOUT SEAT

(76) Inventors: Mi Ja Baek, Seoul (KR); Woon Ha Baek, Cheonan-si (KR)

( * ) Notice: Subject to any disclaimer, the term of this patent is extended or adjusted under 35 U.S.C. 154(b) by 238 days.

(21) Appl. No.: 12/444,523

(22) PCT Filed: Oct. 30, 2007

(86) PCT No.: PCT/KR2007/005400
§ 371 (c)(1),
(2), (4) Date: Apr. 6, 2009

(87) PCT Pub. No.: WO2008/054120
PCT Pub. Date: May 8, 2008

(65) Prior Publication Data
US 2010/0096826 A1   Apr. 22, 2010

(30) Foreign Application Priority Data
Oct. 30, 2006   (KR) .................. 10-2006-0105559

(51) Int. Cl.
*B62M 1/04*   (2006.01)

(52) U.S. Cl. .................. 280/221; 280/253; 280/257
(58) Field of Classification Search .................. 280/221, 280/252, 253, 256, 257
See application file for complete search history.

(56) References Cited

U.S. PATENT DOCUMENTS

| | | | | |
|---|---|---|---|---|
| 4,560,182 A | * | 12/1985 | Yamaguchi | 280/257 |
| 6,454,287 B1 | * | 9/2002 | Fujiwara et al. | 280/252 |
| 7,753,387 B2 | * | 7/2010 | Wei | 280/253 |
| 7,784,808 B2 | * | 8/2010 | Fan | 280/221 |
| 2002/0093171 A1 | * | 7/2002 | Chen | 280/253 |
| 2010/0001487 A1 | * | 1/2010 | Pang | 280/221 |

FOREIGN PATENT DOCUMENTS

| | | | |
|---|---|---|---|
| FR | 2539697 A1 | * | 7/1984 |
| JP | U 64-52894 | | 3/1989 |
| JP | A 2001-199375 | | 7/2001 |
| KR | A 2003-0009205 | | 1/2003 |
| KR | A 10-2005-0092357 | | 9/2005 |

* cited by examiner

*Primary Examiner* — Kevin Hurley
(74) *Attorney, Agent, or Firm* — Greer, Burns & Crain, Ltd

(57) ABSTRACT

A bicycle according to the present invention comprises of a steering axis and an axle of rear wheel that are attached in one unit with a frame to build a form; a pair of guide members with guide holes formed therein are attached to both cut ends of the frame; a pedal axle with the attachment of pedals and a rotating gear in a unit are respectively assembled and fixed onto the guide members; the bicycle according to the present invention comprises a crankshaft of which a pair of crank cams is assembled and fixed into both cut ends of the frame; a gear which engages with the gear; and a spindle which supports a unit of the gear and a sprocket to rotate; the bicycle according to the present invention is run by a running system in which the crank cam rotates when the pedals are reciprocated up and down.

8 Claims, 6 Drawing Sheets

BICYCLE WITHOUT SEAT

This application is a U.S. National Phase under 35 U.S.C. §371 of International Application No. PCT/KR2007/005400, filed Oct. 30, 2007.

FIELD OF INVENTION

The present invention relates to a bicycle. More particularly, the present invention relates to a bicycle that enables a rear wheel to rotate by the movement of reciprocating the pedals up and down. The present invention further relates to the bicycle without a seat, which a user can ride in a standing posture by the movement of reciprocating the pedals up and down and thereafter enables the rear wheel to rotate.

BACKGROUND OF INVENTION

Bicycles are one of the popular means of transportation throughout human history as they have mainly been used for the purposes of movement and transportation. On the other hand, various bicycles have been developed for specific purposes, for instance, recreational sports, mountain climbing, and the like.

Bicycles are mostly run by mechanical running system. With relevance to its structure, a user sits on a seat holding a steering bar and thereafter rotates the pedals by the legs so that the rear wheel rotates. Many researches and efforts have been underway to invent a new way of riding a bicycle, for almost all of the bicycles are conventionally ridden by the method mentioned above.

A bicycle ridden by the movement of reciprocating the pedals up and down is disclosed in Korean Patent Laid-Open No. 2003-9205. The present invention is a new running method by the movement of reciprocating the pedals up and down as opposed to the conventional running method by the rotary movement of pedals.

The present inventors have developed a new running system for a bicycle, which enables a person to rotate the rear wheel by the movement of reciprocating the pedals up and down.

Conventional bicycles are indispensably equipped with a seat due to its running method of rotating the pedals. In the case of riding a bicycle sitting on a seat, a person can mainly expect to exercise the muscle of the lower half of the body, as contrary to the minor effect of exercising the muscle of the upper half of the body. In recent times, bicycles are widely used not just for transportation purposes but also for leisure sports. These bicycles have the effect of exercising the muscles of the whole body and may be fit for the current trend.

Apart from that, a user can enjoy riding the bicycle in a standing posture by pedaling up and down repeatedly. This enables the whole body to work out by which the bicycle is ridden by the user s legs pedaling each pedal by turns while holding the steering bar with both hands. Further, it is more enjoyable to ride the bicycle of the present invention in a standing position than a conventional one.

Furthermore, conventional bicycles are simple and dull whilst the bicycle of the present invention is more energetic and thrilling. Nevertheless, the bicycle of the present invention is neither dangerous nor is it difficult to learn on how to ride it.

Conventional bicycles are equipped with brakes at both the front wheel and the rear wheel, and an accessory stand is also equipped. Anybody who can ride a conventional bicycle will enjoy riding the bicycle of the present invention.

An object of the present invention is to provide a new type of bicycle, which is ridden by the movement of reciprocating the pedals up and down.

Another object of the present invention is to provide a bicycle without a seat by reciprocating the pedals up and down and thereafter enabling the bicycle to move forward.

A further object of the present invention is to provide a bicycle to bring a better effect of exercising the whole body by using thereof in a standing posture rather than riding a bicycle in a sitting position.

Still a further object of the present invention is to provide a bicycle which is much easier to operate in its structure by converting movement of reciprocating the pedals up and down into rotary movement without difficulty.

The objects mentioned above relating to the present invention will be illustrated in detail in the following.

The pedal axle 10 is fixed onto the frame 3 and therefore the former does not rotate, but the guide members 11a, 11b are pivoted on the pedal axle within a certain degree. The pedals 12a, 12b actually move along a circumference, which results in the movement of reciprocating the pedals up and down.

Guide holes 13a, 13b are respectively formed inside the guide members 11a, 11b, and thereafter the protruding members 26a, 26b formed on crank cams 22a, 22b are received into the guide holes.

The crank cams 22a, 22b are assembled into the crankshaft 20 in one unit, and the gear 21 is also assembled on the crankshaft in one unit.

When the pedals 12a, 12b are reciprocated up and down, the protruding members 26a, 26b rotate along the guide holes 13a, 13b, and simultaneously the crank cam 22a, the crankshaft 20, and the gear 21 rotate. For the rotation, there should be a bearing (not shown in the drawings) in between the rotating crankshaft 20 and the frame 3.

When the gear 21 rotates, the engaged gear 31 rotates to the opposite direction, and the sprocket 32 constructed with the gear 31 in a unit rotates together.

The spindle 30 assembled into the frame 3 and fixed thereon does not rotate, but only the gear 31 and the sprocket 32 rotate. Accordingly, the gear 31 and the sprocket 32 with the bearing between are assembled on the spindle 30.

For an easier operation of the running system of the present invention, when pedal 12a is located at the top dead point and the other pedal 12b is located at the bottom dead point, the protruding members 26a, 26b of the crank cams 22a, 22b shall be laid slantly in the same direction of the rotation at the angle of $\theta_3$ from the perpendicular center-line of the crankshaft 20.

The present invention will be illustrated in detail with reference to the attached drawings in the following.

BRIEF DESCRIPTION OF DRAWINGS

The present invention relates to a bicycle which enables a user to run the rear wheel by reciprocating the pedals up and down in a standing posture without the need of a seat. FIG. 1 is a schematic perspective view of the bicycle in which a user can ride in a standing posture without the need of a seat according to the present invention.

With reference to FIG. 1, the bicycle according to the present invention like other conventional bicycles comprises a front wheel 1, a rear wheel 2, a frame 3, a steering axis 5 and the like with other accessorial devices such as a brake, a stand, and so on.

However, unlike any other conventional ordinary bicycles, the wheels 1, 2 are far smaller in size and there is also no seat to sit on. A structured object for converting movement of reciprocating the pedals up and down into rotary movement is placed inside the bifurcated frame of the bicycle according to the present invention. The structured object inside the bifurcated frame is certainly illustrated to be seen for the illustration of the present invention, but it is actually assembled under a covering apparatus (not illustrated here) in the upper middle part of the frame.

The most important technological subject matter in the bicycle of the present invention is about a running system that enables it to convert movement of reciprocating the pedals up and down into rotary movement.

Figure 1:
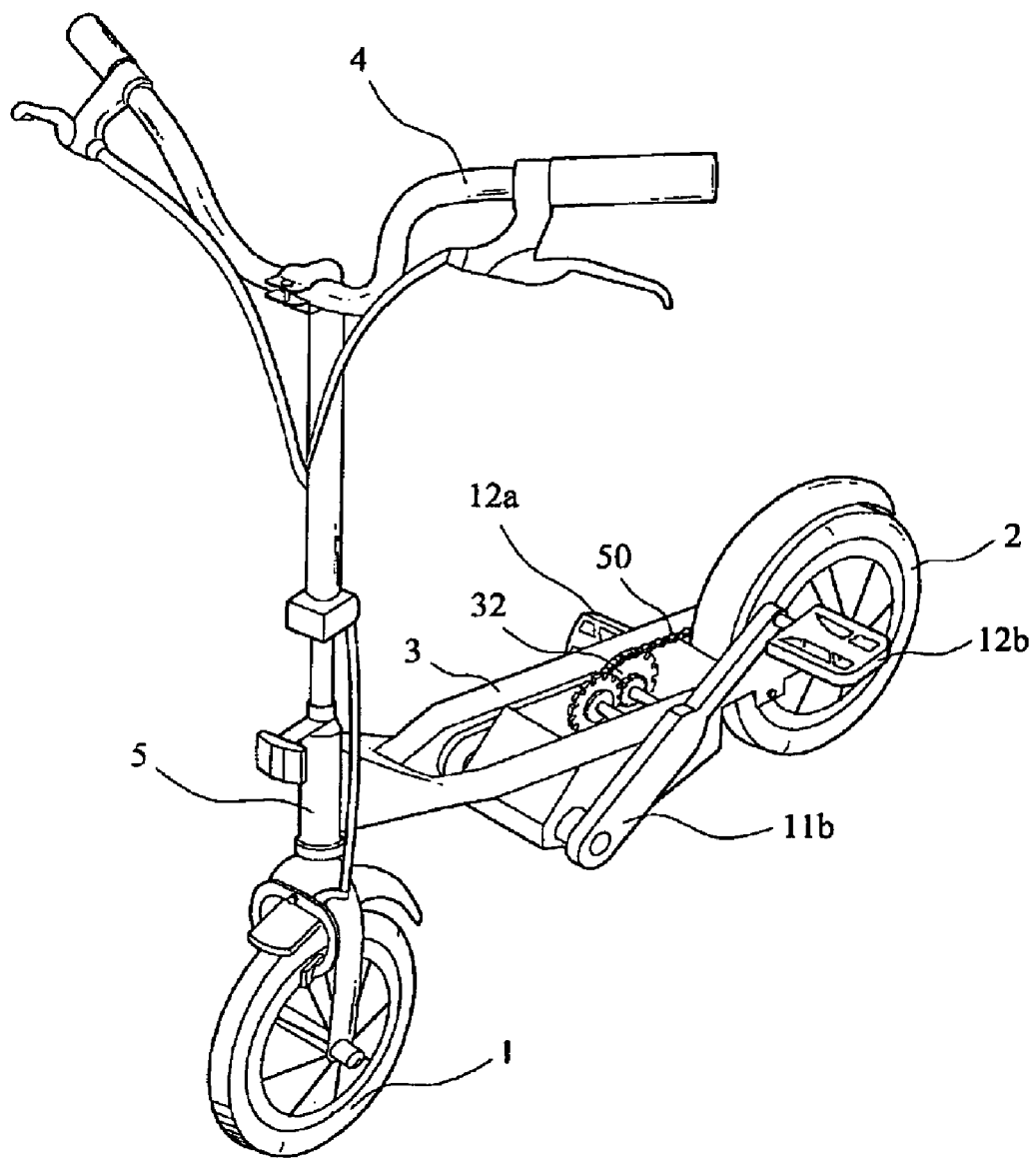
FIG. 1 is a schematic perspective view of a bicycle without a seat according to the present invention.
Figure 2:
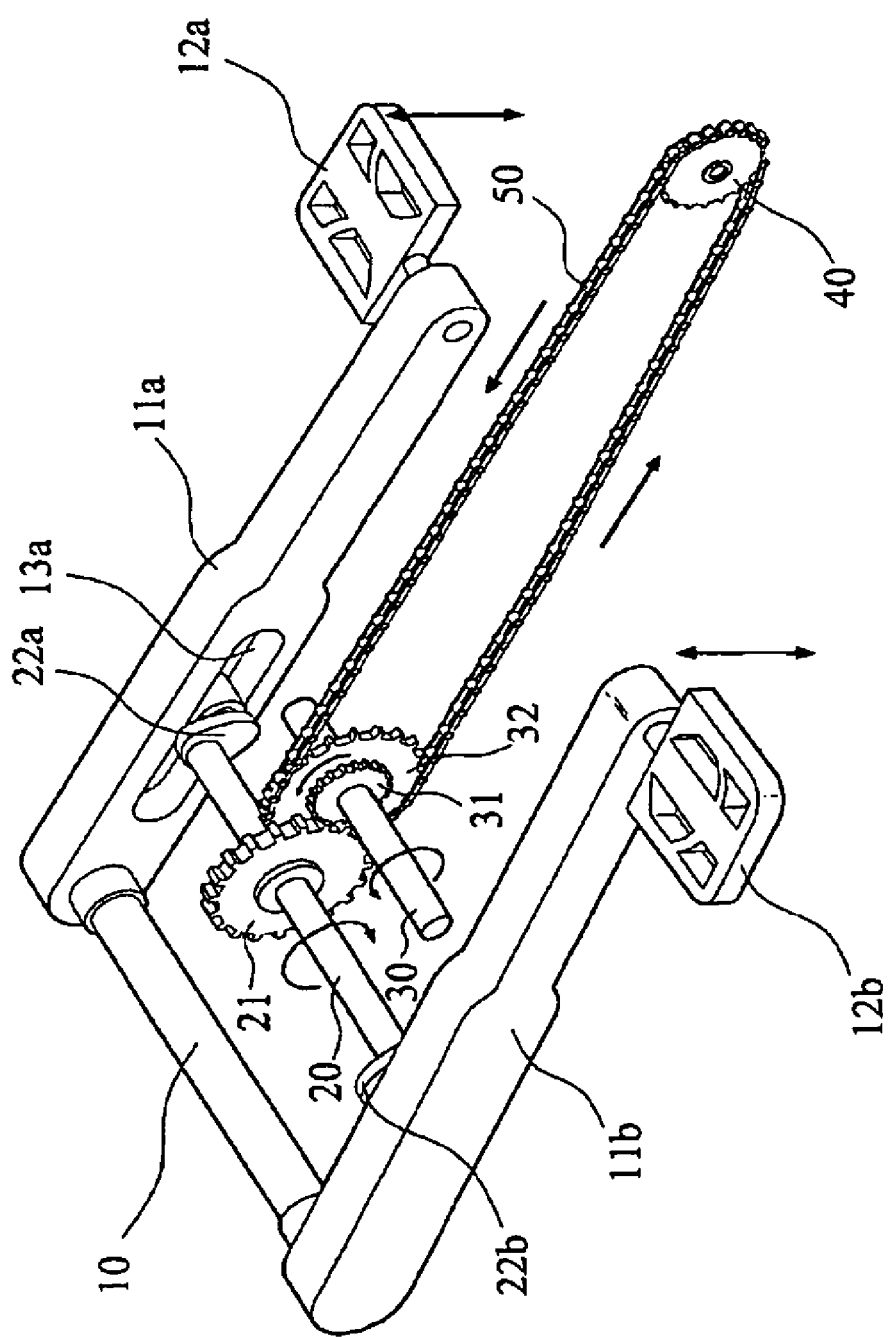
FIG. 2 is a schematic perspective view of a running system of the bicycle without a seat according to the present invention.
Figure 3:
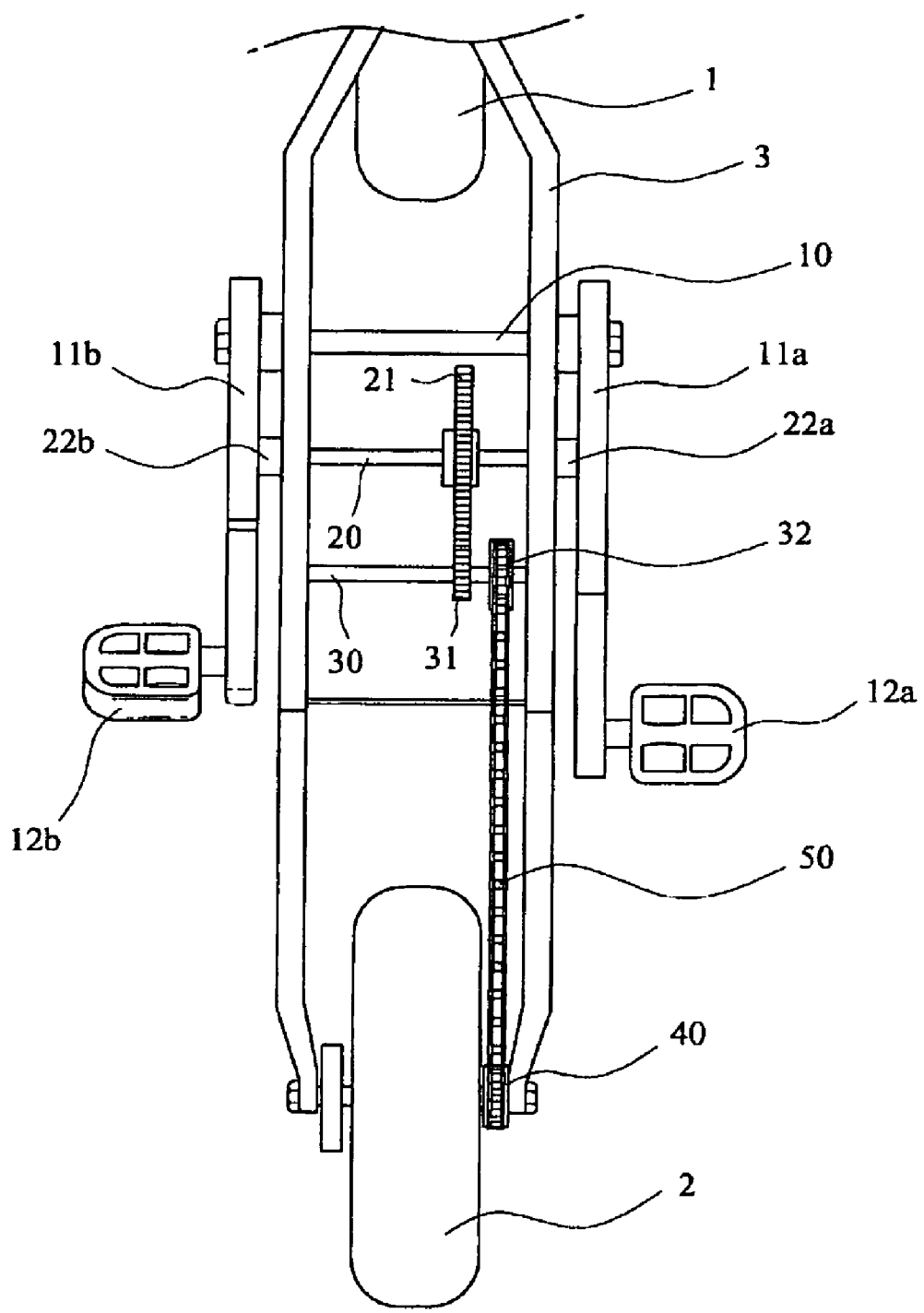
FIG. 3 is a schematic sectional view of the running system of the bicycle without a seat according to the present invention.

FIG. 2 is a schematic perspective view of the running system in the bicycle according to the present invention, and FIG. 3 is a sectional view of the running system for illustration.

The running system according to the present invention is divided into three assemblies: a pedal axis assembly comprising a pedal axle 10, a pair of guide members 11a, 11b, and a pair of pedals 12a, 12b; a crankshaft assembly comprising a crankshaft 20, a gear 21, and a pair of crank cams 22a, 22b; and a spindle assembly comprising a spindle 30, a gear 31, and a sprocket 32.

Figure 4:
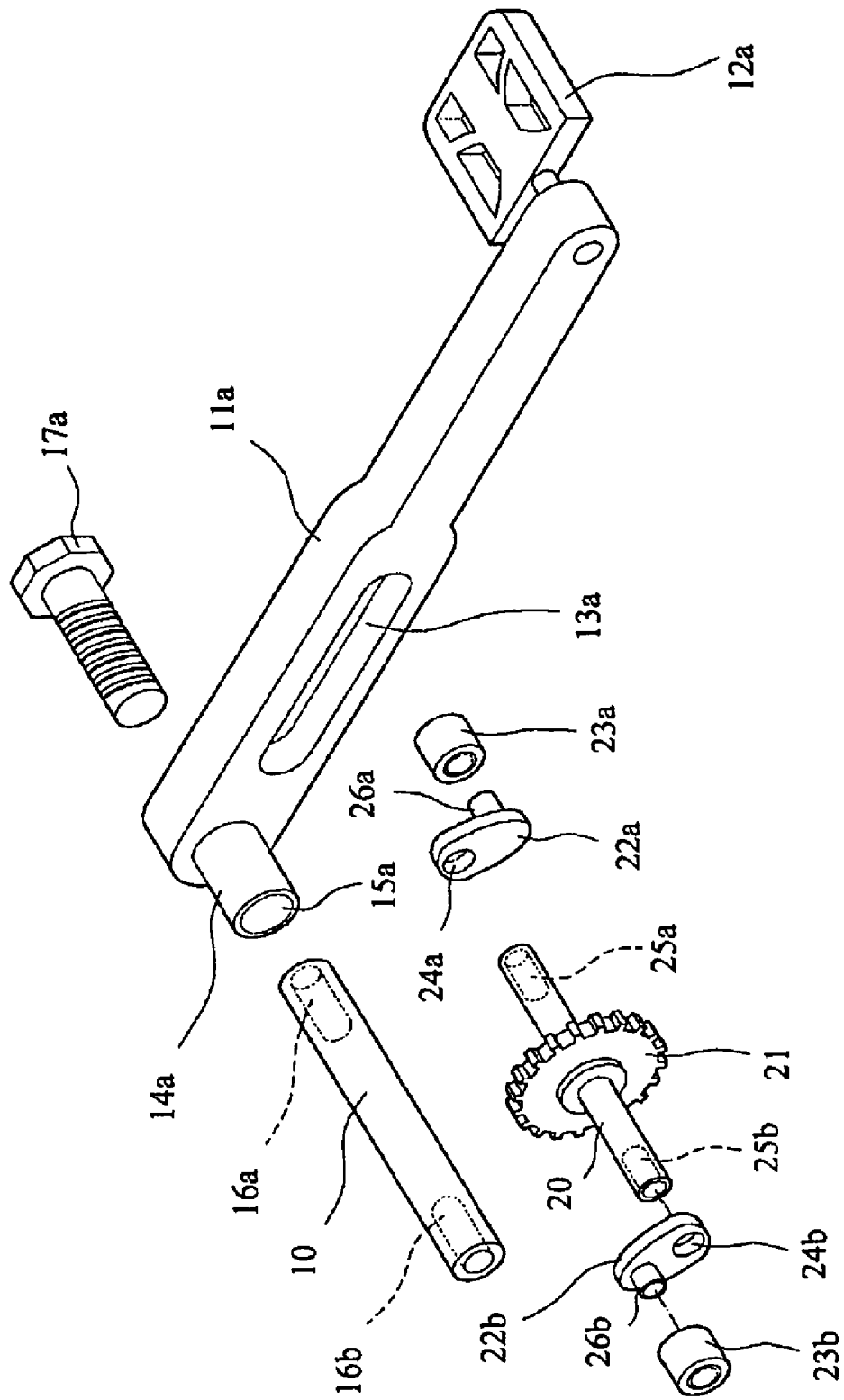
FIG. 4 is a schematic perspective exploded view of the running system according to the present invention for converting movement of reciprocating up and down into rotary movement.

The crank cams rotating by movement of reciprocating the pedals up and down, convert the reciprocating movement into rotary movement. FIG. 4 is a perspective exploded view of the main parts for better comprehension of the running system according to the present invention. With reference to FIGS. 2 to 4, a structure of the running system and a method thereof will be illustrated in detail in the following.

(A) Pedal Axle Assembly

A pedal axle assembly comprises a pedal axle 10, a pair of guide members 11a, 11b, and a pair of pedals 12a, 12b. The pedal axle 10 fixed onto the frame 3 does not rotate. Guide members 11a, 11b are respectively assembled onto the both end parts of the pedal axle, and pedals 12a, 12b are respectively attached with the guide members.

The pedal axle 10 is fixed onto the frame 3, but the guide members 11a, 11b are assembled to pivot on the pedal axle. On the other hand, the guide members do not rotate for one round completely but rotate within a certain range of angle since the guide hole 13 is formed in the guide members with the crank cam 22 received and assembled thereinto.

The pedals 12a, 12b attached with the cut ends of the guide members, rotate along a circumference, which results in movement of reciprocating the pedals up and down. If a pedal 12a goes down, the other pedal 12b goes up, and if the pedal 12a goes up, the other pedal 12b goes down. The bicycle moves forwards while the pedals are reciprocated up and down.

For pedals to be reciprocated up and down, a bearing has to be placed in between guide members 11a, 11b and pedal axle 10, which can be carried out easily by an ordinary skilled person in the art.

Binding holes 16a, 16b are formed inside the cut ends of the pedal axle 10. An assembling member 14 in which an assembling hole is formed is attached with the guide member 11. In a process of the assemblage of the guide members into the pedal axle, the pedal axle is inserted into the assembling hole 15 and thereafter fixed by a bolt 17.

(B) Crankshaft Assembly

A crankshaft assembly comprises a crankshaft 20, a gear 21, and a pair of crank cams 22a, 22b. The crankshaft 20, the gear 21, and a pair of the crank cams rotate in one unit at the same time. The crankshaft and the crank cams are assembled through the assembling hole 24 and the binding hole 25 with a bolt (not illustrated here) to form one unit.

The crankshaft 20 is fixed into the frame 3, and a bearing (not illustrated here) shall be placed in between the frame and the crankshaft for the crankshaft to rotate, which can be carried out easily by an ordinary skilled person in the art.

The protruding members 26a, 26b formed on the crank cams 22a, 22b in a unit are received into the guide holes 13a, 13b formed inside the guide members 11a, 11b, and functions to convert movement of reciprocating the pedals up and down into rotary movement of the crank cam. When the protruding members 26a, 26b rotate as put inside the guide holes of the guide members 11a, 11b, it shall be proper for the protruding members 26a, 26b to be inserted into idlers 23a, 23b to make the rotation smoother and minimize friction.

Meanwhile, the location of the protruding member 26a (or idler 23) when one pedal 12a is laid at the top dead point is very important in the present invention. The principle is illustrated in FIGS. 5, and 6.

Figure 5:
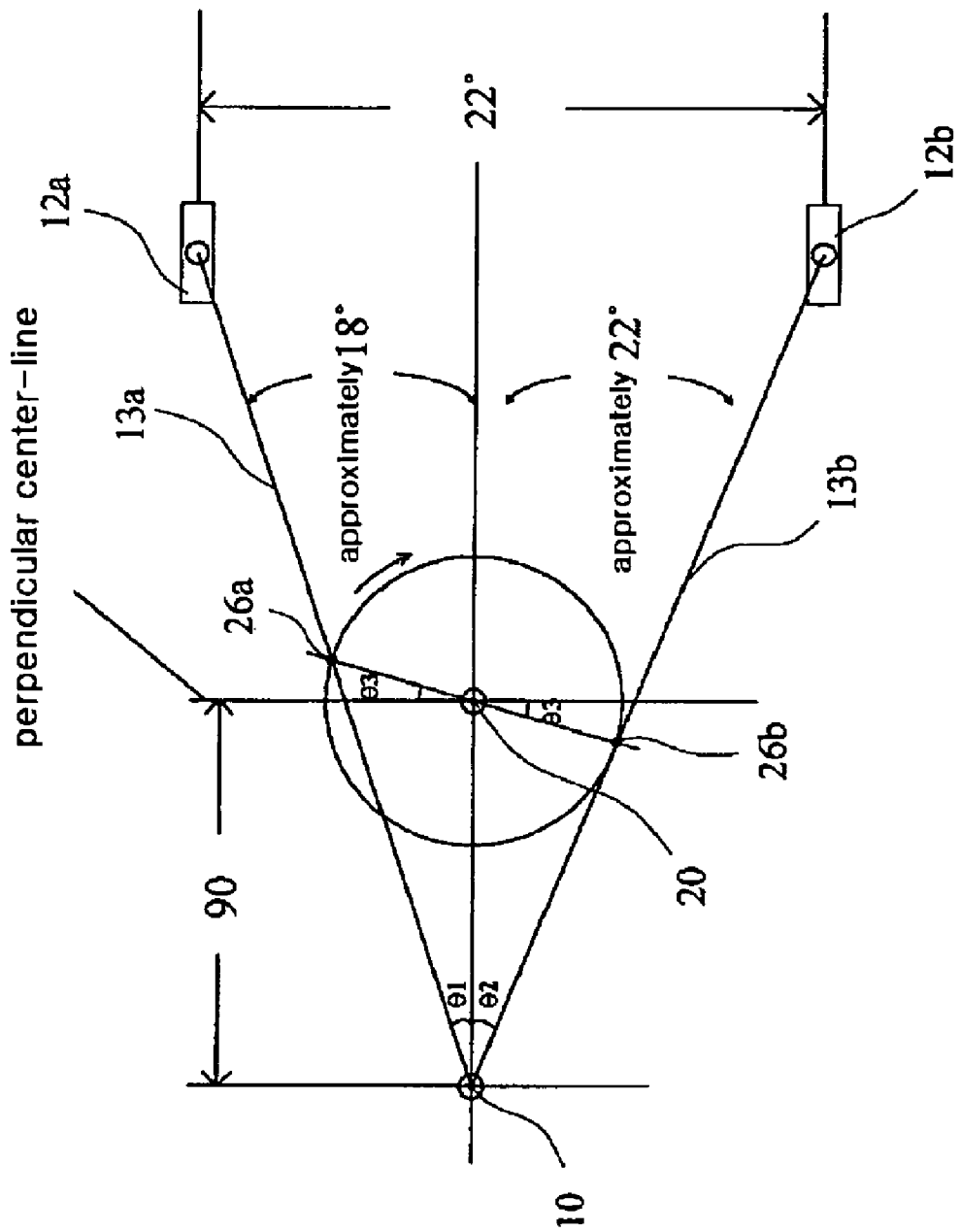
FIG. 5 is a drawing which illustrates the principle of converting movement of reciprocating up and down into rotary movement in the running system according to the present invention.

FIG. 5 is a drawing which illustrates the principle of converting movement of reciprocating up and down into rotary movement in the running system according to the present invention.

Figure 6:
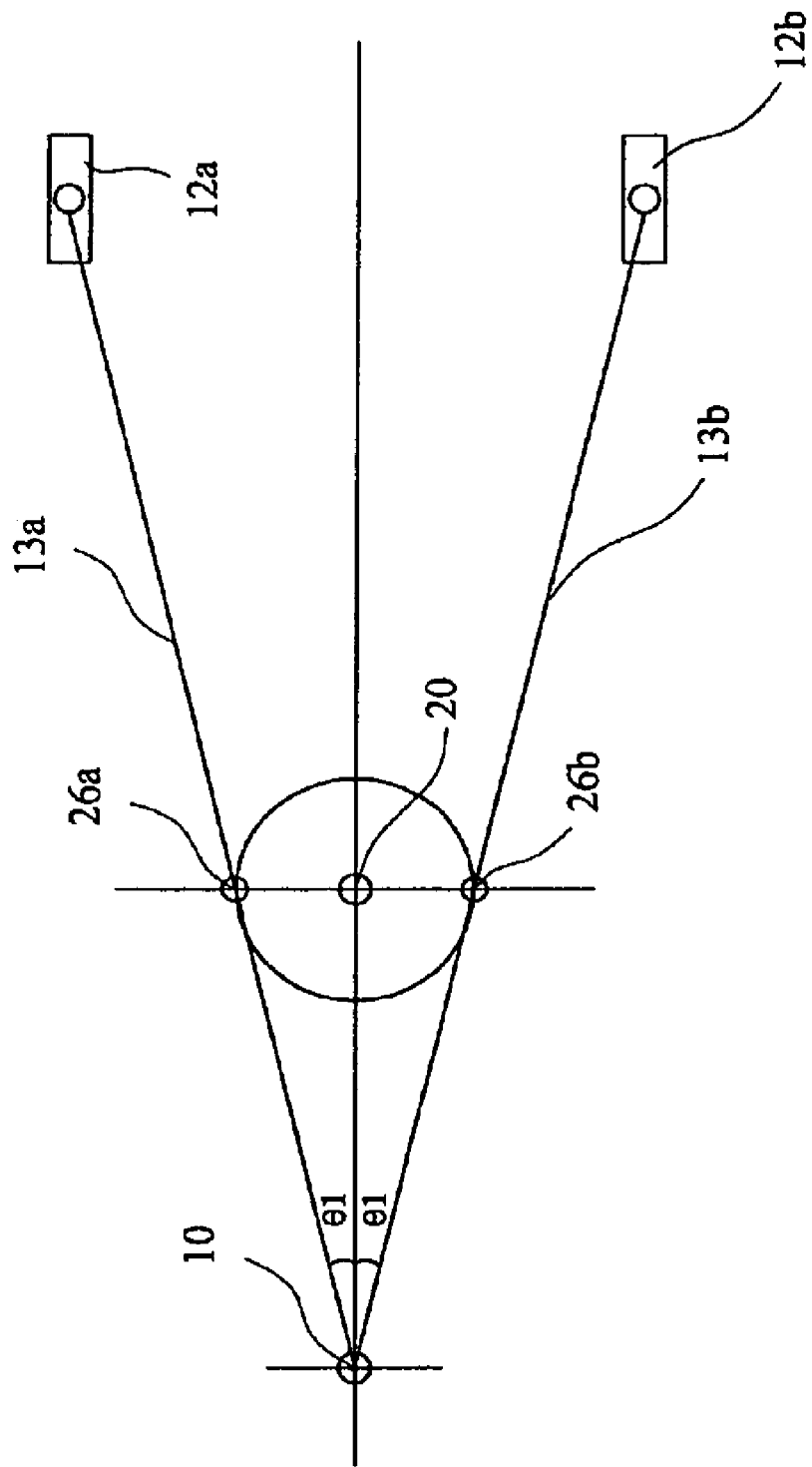
FIG. 6 is a drawing which illustrates the principle of converting movement of reciprocating up and down into rotary movement in the running system according to the present invention wherein the drawing is a diagram in the case when the present invention cannot possibly work.

FIG. 6 is a drawing which illustrates the principle of converting movement of reciprocating up and down into rotary movement in the running system according to the present invention wherein the drawing is a diagram in the case when the present invention cannot possibly work.

With reference to FIG. 5, the pedal 12b is laid at the bottom dead point when the pedal 12a is located at the top dead point. The protruding member 26a of the crank cam 22a shall be laid slantly at the angle of $\theta_3$ from the perpendicular center-line. The angle of $\theta_3$ shall fall within the range of 5° to 45°, but it is not limited to the scope.

The pedal 12a is located at the bottom dead point when the pedal 12b is located at the top dead point. The protruding member 26b of the crank cam 22b in this case is also laid slantly at the angle of $\theta_3$ from the perpendicular center-line of the crankshaft 20.

If the protruding member 26a of the crank cam 22a is laid slantly at the angle of $\theta_3$ from the perpendicular center-line of the crankshaft 20, the pedal 12a goes easily down when the pedal 12a is pedaled, and as a result the crank cam rotates easily. When the pedal 12b is pedaled with left foot the pedal 12b goes down to the bottom dead point by the weight, the protruding member 26b of the crank cam 22b at this time is laid slantly at the angle of $\theta_3$ from the perpendicular center-line of the crankshaft 20. When the pedal 12b goes down to the bottom dead point, the pedal 12a goes up to the top dead point, the protruding member 26a of the crank cam 22a is laid slantly at the angle of $\theta_3$ from the perpendicular center-line of the crankshaft 20. If the pedal 12a is pedaled with right foot at this time, the pedal 12a goes easily down to the bottom dead point by the weight. This action is repeated consecutively.

If, as referred to the FIG. 6, the protruding member 26a of the crank cam 12a is located along the perpendicular center-line and not laid slantly at the angle of $\theta_3$ from the perpendicular center-line of the crankshaft 20, the pedal 12a when pedaled does not go down. That is, it is not possible to rotate the crank cam in this case. Accordingly, as illustrated in FIG. 5, the angle $\theta_1$ at the time when the pedal 12a reaches the top dead point shall always be smaller in size than the angle $\theta_2$ at the time when the pedal 12b reaches the bottom dead point. The angle may differ depending on the distance between the pedal axle 10 and the crankshaft 20 or the radius (length) of the crank cam, but it is usually proper for $\theta_1$ to be smaller than $\theta_2$ by 2° to 10° in size. In FIG. 5, the distance between the pedal axle 10 and the crankshaft 20 is 90 mm, the radius (length) of the crank cam is 35 mm, $\theta_1$ is 18°, $\theta_2$ is 22°, and the distance between the top dead point and the bottom dead point is 220 mm, but this is merely an example and therefore these are all modifiable depending on the size of a bicycle.

In particular, the distance between the top dead point and the bottom dead point is very important with regard to the amount of exercise. The distance between the top dead point and the bottom dead point is closely related with the length and the angle of the guide members 11a, 11b. A distance of the reciprocating movement may be properly determined within the range of 150 to 300 mm.

(C) Spindle Assembly

A spindle assembly comprises a spindle 30, a gear 31, and a sprocket 32. When the pedals 12a, 12b are reciprocated up and down, the protruding members 26a, 26b rotate along the guide holes 13a, 13b, and simultaneously the crank cams 22a, 22b, the crankshaft, and the gear 21 rotate together.

When the gear 21 rotates, the engaged gear 31 rotates to the opposite direction, and the sprocket 32 placed with the gear 31 in one unit rotates together.

The spindle 30 assembled and fixed onto the frame 3 does not rotate, but only the gear 31 and the sprocket 32 rotate. Accordingly, the gear 31 and the sprocket 32 with a bearing (not illustrated in a diagram) therebetween are assembled on the spindle 30.

As referred to FIGS. 2 and 3, the gear 31 is smaller than the gear 21 in size, which means that when the gear 21 rotates for one round the gear 31 rotates for a lot more rounds. Further, the number of the rotation of the gear 31 and the sprocket 32 is identical, but the linear speed of the sprocket 32 is faster than the linear speed of the gear 31 owing to the fact that the radius of the sprocket 32 is larger than the radius of the gear 31. It means that the rear wheel can rotate faster in proportion to that difference in radius. The sprocket 32 is connected to the rear wheel sprocket by a chain, and the rear wheel rotates as the rear wheel sprocket rotates. Preparing different sizes of these gears can be easily carried out by an ordinary skilled person in the art.

If a running system like this is applied to a bicycle, a bicycle without a seat is possibly produced thanks to the movement of reciprocating up and down. The bicycle without a seat requires riding in a standing posture, and in so doing, enables the whole body to work out its muscles with greater effect.

The present invention has the effects of enabling the rear wheel to rotate by the movement of reciprocating the pedals up and down and to provide a bicycle without a seat to run by such movement. Further, the present invention provides a smooth running for the bicycle by converting movement of reciprocating the pedals up and down efficiently into rotary movement.

The present invention shall be easily carried out by an ordinary skilled person in the art, and any modifications and changes are deemed to be within the scope of the present invention.

The invention claimed is:

1. A bicycle without a seat having a front wheel, a rear wheel, a steering bar, a steering axis, and a frame which assembles and supports the steering axis and the rear wheel, said bicycle comprising:
    a pedal axle assembly including a pedal axle fixed onto the frame, first and second guide members into which both cut ends of the pedal axle are assembled and which a pair of guide holes are respectively formed;
    a crankshaft assembly including a crankshaft which is fixed onto the frame and rotates, a crankshaft gear which is assembled on the crankshaft, and first and second crank cams on which there are attached, respectively, first and second protruding members which are respectively received into the first and second guide members; and
    a spindle assembly including a spindle which is fixed onto the frame, a spindle gear which engages with the crankshaft gear and rotates, and a spindle sprocket which is placed with the spindle gear and connected to a rear wheel sprocket by a chain;
    wherein the crankshaft and the crankshaft gear rotate simultaneously, and the spindle gear engages the crankshaft gear to rotate together;
    wherein said first protruding member of the first crank cam is laid at an angle of $\theta_3$ from a perpendicular line of the crankshaft when a pedal attached to said first guide member reaches a top dead point.

2. The bicycle without a seat as defined in claim 1, wherein said angle of $\theta_3$ is within a range from 5° to 45°.

3. The bicycle without a seat as defined in claim 1, wherein said crankshaft gear is bigger than the spindle gear in size, the spindle sprocket is bigger than the spindle gear in size, and the rear wheel sprocket is smaller than the spindle sprocket in size.

4. A bicycle without a seat having a front wheel, a rear wheel, a steering bar, a steering axis, and a frame which assembles and supports the steering axis and the rear wheel, said bicycle comprising:
    a pedal axle assembly including a pedal axle fixed onto the frame, first and second guide members into which both cut ends of the pedal axle are assembled and which a pair of guide holes are respectively formed;
    a crankshaft assembly including a crankshaft which is fixed onto the frame and rotates, a crankshaft gear which is assembled on the crankshaft, and first and second crank cams on which there are attached, respectively, first and second protruding members which are respectively received into the first and second guide members; and
    a spindle assembly including a spindle which is fixed onto the frame, a spindle gear which engages with the crankshaft gear and rotates, and a spindle sprocket which is placed with the spindle gear and connected to a rear wheel sprocket by a chain;
    wherein the crankshaft and the crankshaft gear rotate simultaneously, and the spindle gear engages the crankshaft gear to rotate together;

wherein an angle $\theta_1$ at a time when a first pedal attached to the first guide member reaches a top dead point is smaller than an angle $\theta_2$ at a time when a second pedal attached to the second guide member reaches a bottom dead point.

5. The bicycle without a seat as defined in claim 4, wherein said angle $\theta_1$ is smaller than $\theta_2$ by 2° to 10°.

6. The bicycle without a seat as defined in claim 4, wherein said crankshaft gear is bigger than the spindle gear in size, the spindle sprocket is bigger than the spindle gear in size, and the rear wheel sprocket is smaller than the spindle sprocket in size.

7. A running system which converts reciprocating movement into rotary movement, comprising:

pedal axle assembly including a pedal axle fixed onto a frame, first and second guide members into which both cut ends of the pedal axle are assembled and in which a pair of guide holes are formed respectively;

a crankshaft assembly including a crankshaft which is fixed into the frame and rotates, a crankshaft gear which is constructed on the crankshaft, and first and second crank cams on which there are attached first and second protruding members which are respectively received into the first and second guide members; and a spindle assembly including a spindle which is fixed onto the frame, a spindle gear which engages with the crankshaft gear and rotates, and a spindle sprocket which is placed with the spindle gear and connected to a rear wheel sprocket by a chain;

wherein the crankshaft and the crankshaft gear rotate simultaneously, and the spindle gear engages with the crankshaft gear to rotate together when pedals attached to the first and second guide members are reciprocated up and down;

wherein said first protruding member of the first crank cam is laid slantly at an angle of $\theta_3$ from a perpendicular center-line of the crankshaft when said pedal attached to the first guide member reaches a top dead point.

8. The running system as defined in claim 7, wherein said angle $\theta_3$ falls within a range from 5° to 45°.

* * * * *